Dec. 27, 1960   H. W. COKE   2,966,266
MINERAL FLOTATION APPARATUS AND METHOD
Filed Dec. 11, 1957   3 Sheets-Sheet 1
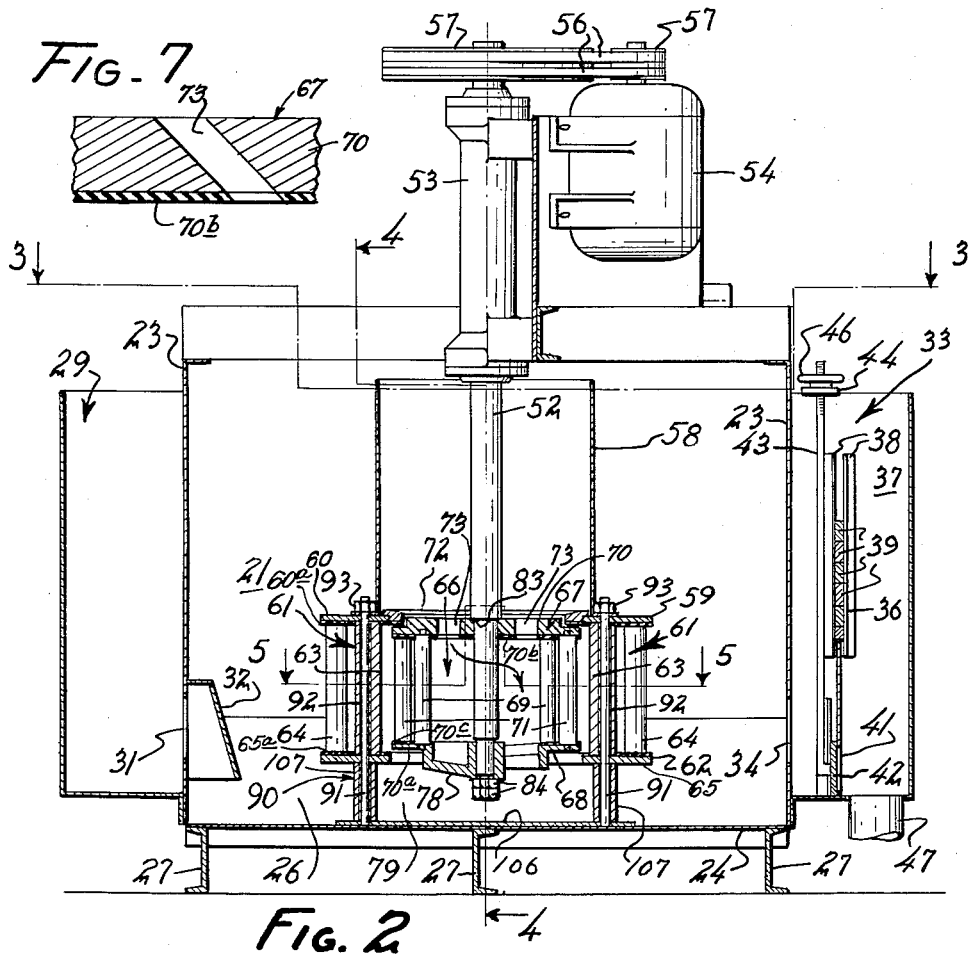
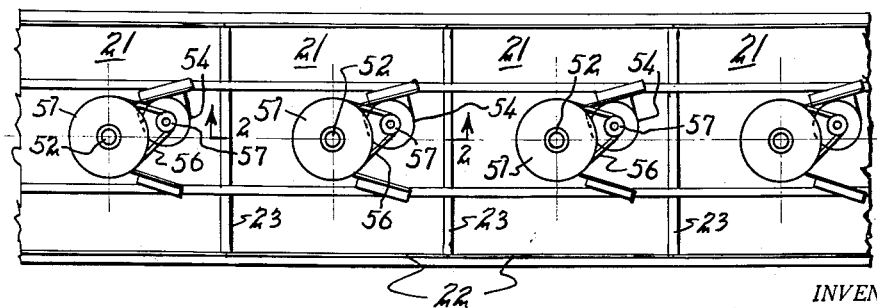
INVENTOR.
HUGH W. COKE
BY
Townsend and Townsend
ATTORNEYS Dec. 27, 1960 H. W. COKE 2,966,266
MINERAL FLOTATION APPARATUS AND METHOD
Filed Dec. 11, 1957 3 Sheets-Sheet 2

INVENTOR.
HUGH W. COKE
BY
Townsend and Townsend
ATTORNEYS

INVENTOR:
HUGH W. COKE
BY
Townsend and Townsend
ATTORNEYS

United States Patent Office 2,966,266
Patented Dec. 27, 1960

2,966,266

MINERAL FLOTATION APPARATUS AND METHOD

Hugh W. Coke, Jamestown, Calif.

Filed Dec. 11, 1957, Ser. No. 702,173

14 Claims. (Cl. 209—168)

This invention relates to a new and improved mineral flotation apparatus and method wherein an aeration tank is provided with a rotary impeller surrounded by stationary scrubbers.

Mineral flotation comprises the separation of particles from a mass of pulverized ore wherein the valuable particles adhere to bubbles produced in the liquid by the addition of a reagent. The present invention involves a means and method for improving the separation by improved aeration action and dressing of the mineral particles.

This invention further relates to a new and improved aerating apparatus and method and more particularly an aerating apparatus having an impeller rotatable about a vertical axis centrally positioned within an open top tank or cell and disposed within a fluid medium, such as metallurgical pulp or flotation pulp. Accordingly, the present invention relates to a flotation machine wherein the impeller is surrounded by a stationary stator having multiple rows of scrubbers or stator staves of novel contour and arrangement to provide maximum surface scrubbing area for the solid recoverable substance contained within the flotation pulp while being expelled centrifugally from the impeller.

Reference is made to my co-pending application Serial No. 469,594 filed November 18, 1954, for Mineral Flotation Apparatus and Method, now abandoned, in which the present application is a continuation in part.

Flotation pulp consists of ground ore, a fluid, such as water, and a reagent or mixture of reagents forming a pulp mass. The art of flotation comprises separation of desired particles of ground ore (generally referred to as flotation concentrates) to bubbles or froth produced in the pulp mass by the introduction of air into the pulp mass so as to produce a multiplicity of finely divided bubbles or froth which inherently rise to the surface of the fluid within the tank.

The present invention involves a means and method for improving flotation by improved aeration action and dressing of the desired ground ore particles. One of the important features of the present invention is the provision of an improved impeller or rotor and a stationary stator with scrubbers or stator staves adjacent the impeller, which scrub, scour and clean the surfaces of the desired particles in order to remove the deleterious slimes or other adhering matter. It has long been recognized that removal of such adhering matter greatly improves the efficiency of the flotation or separation process. By cleaning the particles better reagent contact is obtained and thus inherently the bubble or froth adherence to the particles is augmented. The efficiency and economy of the flotation process is thus enhanced in accordance with this invention.

Scrubbing, scouring or cleaning is materially improved by various instrumentalities in the present invention. One of the most important means is the combination of the rotor and the stationary stator construction which provides maximum surface area for positive shearing action between the particles and adhering matter during the period of greatest velocity as the pulp is forced to traverse the surface area.

Still another means of accomplishing the scrubbing action is the fact that the scrubbing is carried out in the flotation machine itself rather than as a preliminary step in a separate attrition machine. Inasmuch as the cleansing is carried out in the flotation machine, the readherence of the foreign matter to the particle surfaces is avoided.

One of the most important means of improving the efficiency of the flotation process in accordance with this invention is the impeller and stationary scrubber construction which sharply forces the pulp into stator pockets, where, at the moment of greatest velocity, a shearing occurs as the pulp flows outwardly. By this means, the adhering matter is removed from the particle surfaces.

Another feature of the invention is the provision of means which forces the air in finely divided form into solution in the pulp and then abruptly precipitates the air in the form of froth to secure better adherence of the mineral particles to the air bubbles thus produced. This effect is accomplished by the construction of the impeller vanes and further by the provision of pockets between the scrubbers between which the pulp is forced, whereby the velocity is increased and then decreased, first forcing air into solution and then precipitating the air.

Another feature of the invention is the provision of means for more actively dispersing a large volume of air into the flotation pulp. The air is broken up and preconditioned, as heretofore explained, before and while being expelled into the pockets.

Another feature for more effective dispersion of the air is the pulsation effect which very rapidly puts the air into solution and then precipitates the same upon the mineral surfaces.

Another feature of the invention is the provision of an impeller having staves of cylindrical form arranged in pairs. One stave of each pair is angularly radially offset relative to the other and further, the staves have different circumferential linear speeds. This construction more effectively disperses and forcefully churns the pulp and air about the leading surfaces and between each stave of each pair of staves, causing a shearing action between the pulp particles and the adhering matter while the same are being forced under centrifugal velocity from the interior of the rotor into the nozzle pockets or throats formed between the stator staves or scrubbers.

Another feature of the invention is the provision of a rotor having stator staves arranged in pairs as hereinabove described and thereby providing means for more effectively dispersing a large volume of air in finely divided particles into the flotation pulp. This construction causes better production of bubbles (froth) for the purposes hereinbefore mentioned.

Another advantage of the present invention is the arrangement of the impeller having pairs of cylindrical staves. One stave of each pair is angularly and radially offset relative to the other so that each pair functions as a pump vane. The pulp is drawn into the stator at considerable velocity, which pulsates. The relatively close spacing between the rotor and stator insures that the force of flow is not dissipated.

Another feature of the invention is the fact that there is provided a plurality of pockets in the stator which are subjected to rapid increase and decrease in pressure so that before the pulp flows out into the main body of the aeration tank, it is subjected to several increases and decreases in pressure.

Still another advantage is the construction of the stationary stator with multiple rows of stator staves or scrubbers arranged circumferentially around the rotor so that the pulp and air being expelled from the rotor under centrifugal force is forced through the multiplicity of spaces or pockets between the stator staves. The stator staves extend vertically between an upper and a lower spider, the lower spider being supported by a support means which extends from the bottom face of the lower spider directly to the bottom of the tank. The space between the bottom of the tank and the lower spider provides a suction space for entrance of pulp into the rotor.

A still further feature of the invention is the provision of an inner row of stator staves of a contour such that the edge nearest the rotor is of less thickness than that of the edge furthest from the rotor. When viewed in a horizontal plane there is provided a series of spaces between the inner row of stator staves in the shape of hydraulic nozzles. The nozzle openings or spaces between the staves are minimum at the edge furthest away from the rotor. Accordingly, centrifugal force causes the expelled pulp to traverse the pulp stream between the rows of stator staves and abrade against the corresponding surfaces of the outer row of stator staves. The shearing action between the pulp particles and adhering matter is further improved.

Another feature of the invention is the fact that the inner row of stator staves includes a series of tapered nozzle throats. Each throat is formed by adjacent sides of a pair of stator staves and accordingly, a structure is provided in which the length of the sides of the throat added to the length of the edge of the stator stave facing the rotor comprises a scrubbing surface. The perimeter of this surface when measured in a horizontal plane comprises the greater portion of the perimeter of each stave.

The action of the apparatus is novel in that there is provided a plurality of compression pockets in the rotor and in the stator which subjects the combined air and pulp to rapid variations in pressure so that before the pulp and air are forced out into the main body of the tank, it is subjected to several increases and decreases in pressure, thereby causing the air to be divided into fine bubbles or froth.

Further features of the machine reside in its moderate power input requirement, its positive circulation of pulp even with relatively coarse pulp feeds, and its excellent wear characteristics.

The effect of the present machine and method is a quickness of action of the machine in separating components from the pulp, a higher and sharper degree of separation of materials, and a higher recovery.

Other objects of the present invention will become apparent upon reading the following specification and referring to the accompanying drawings in which similar characters of reference represent corresponding parts in each of the several views.

In the drawings:

Fig. 1 is a top plan of the mid-portion of a bank of flotation machines in accordance with this invention;

Fig. 2 is an enlarged vertical sectional view taken substantially along line 2—2 of Fig. 1 as modified to include a pulp inlet and a pulp outlet box;

Fig. 7 is an enlarged fragmentary sectional view through a vane of the impeller spider taken substantially along line 7—7 of Fig. 3.

Figure 3:
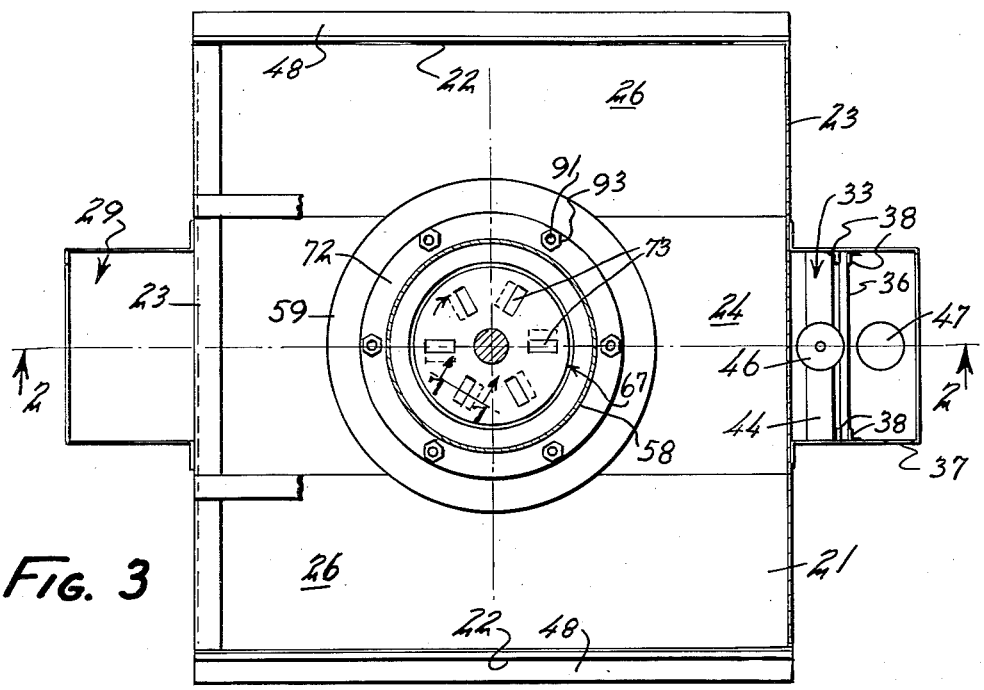
Fig. 3 is a horizontal sectional view taken substantially along line 3—3 of Fig. 2.

As illustrated in Figs. 1–7, the apparatus which comprises the present invention insofar as its illustration and description are deemed necessary to a full and complete description of the invention, is installed in one or in each of a series of square, open-top aeration tanks or cells 21 having substantially vertical sides 22 and ends 23. Opposite sides 22 adjacent the bottom 24 have slanted portions 26 which connect with bottom 24. Bottom 24 is supported by a plurality of beams 27 with stringers 28 connected to beams 27 and slanted portions 26 so that beams 27 form the support base for tank 21.

Externally, at one end of the aeration tank, is a pulp inlet box or feed box 29 into which the entering pulp is fed by means of a pipe or launder (not shown) from the preceding machinery in the process (not shown). Reagents may be added to the pulp in the box or at a preceding stage in the process. Pulp inlet box 29 communicates with aeration tank 21 through an aperture 31 in one of end walls 23. A downwardly slanted deflection plate 32 positioned adjacent aperture 31 directs the pulp flow downwardly toward bottom 24, as best seen in Fig. 2.

On the opposite end of the aeration tank is a pulp outlet box 33 which communicates with aeration tank 21 through aperture 34 in one of end walls 23. Located within pulp outlet box 33 is a weir 36. Above weir 36 fixed to the side walls 37 of box 33 are guides 38 for a plurality of removable baffles 39 which can be added or subtracted to regulate the height of pulp in tank 21. Weir 36 has an outlet 41 which is closed, or partly closed, by gate 42 attached to the lower end of threaded gate rod 43 which passes through an aperture in transverse bar 44 on the top of outlet box 33. Hand wheel 46 on rod 43 is employed to adjust the position of gate 42 to open or close outlet 41. Outlet 41 is for discharge of coarse sand, whereas the pulp overflows topmost baffle 39 and passes off through pipe 47 communicating through the bottom of outlet box 33 beyond weir 36.

As well understood in this art, aeration tank 21 may be used either singly or in a bank of tiers, as illustrated in Fig. 1. In the latter instance, pulp inlet box 29 and outlet box 33 between tanks are eliminated and the adjacent tanks are suitably fastened together end to end as a unit, with apertures 41 and 31 in registry.

Froth is removed from tank 21 by overflow froth lips 48 fixed to opposite side walls 22 of the tank. Froth flows into conventional concentrate launders which conduct the flow to subsequent processing stages.

Figure 4:
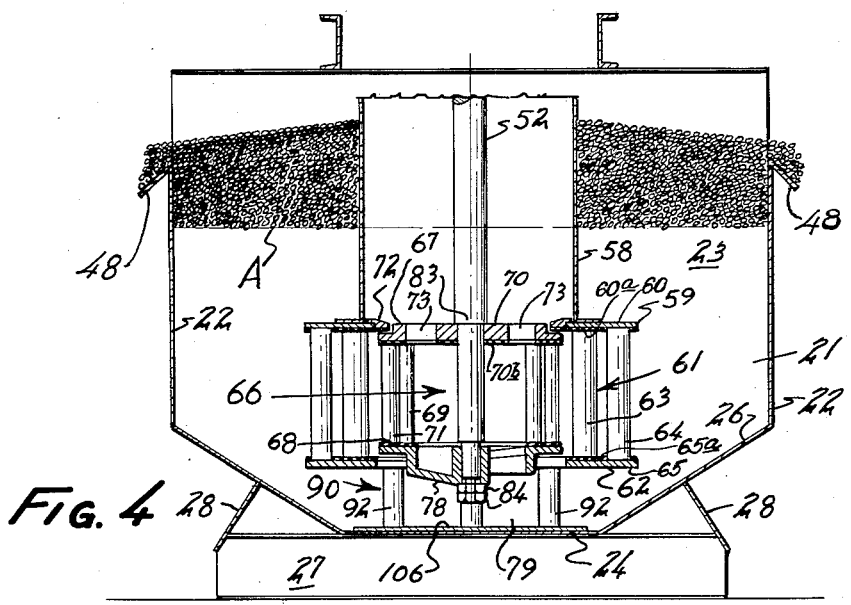
Fig. 4 is a vertical sectional view taken substantially along line 4—4 of Fig. 2.

Mounted centrally of the aeration tank is a vertically disposed shaft 52 suitably supported in bearing housing 53 above the normal pulp level A, shown by dash line in Fig. 4. Shaft 52 is driven by electric motor 54 through V-belts 56 and pulleys 57. Shaft 52 terminates at a position spaced upwardly from bottom 24.

Surrounding the portion of shaft 52 below bearing housing 53 and extending below pulp level is an enlarged air tube 58 having an open upper end located above pulp level. The lower end of tube 58 is attached to the upper spider 59 of the stator 61. Stator 61 comprises annular upper spider 59 and lower spider 62, between which are positioned inner and outer stator staves or scrubbers 63 and 64, respectively, which are hereinafter described in detail. Lower spider 62 is supported elevated above bottom 24 by stator support means hereinafter described. Spiders 59 and 62 are annular and positioned within the central apertures thereof is rotor or impeller 66, which comprises upper impeller spider 67 and lower impeller spider 68 connected together by inner and outer rotor staves 69 and 71, respectively, hereinafter described in greater detail. The upper and lower impeller spiders are keyed to and supported by shaft 52. Annular ring 72 which is suspended from upper stator spider 59 partially closes off the lower end of air tube 58 and reduces the tendency of the pulp to rise in tube 58. However, its application is optional.

A plurality of openings 73 are formed in upper impeller spider 67 freely to permit air being drawn from tube 58 into rotor 66 upon the latter being rotated by shaft 52. Referring to Fig. 3, rotor 66 rotates in a clockwise direction and openings 73 are slanted downwardly in a counterclockwise direction, as best shown in Fig. 7, in such manner that when rotor 66 revolves, slanted openings 73 assist in scooping air down into rotor 66. Although six openings 73 are shown in the accompanying drawings, it will be understood that the number and form of such openings is subject to modification. The effect of the location of openings 73 is such as to draw air from tube 58 down into rotor 66 to accomplish aeration.

Lower impeller spider 68 is formed with a plurality of upwardly slanted blades 78 which comprise short sections of helices so directed that, as rotor 66 revolves, pulp is lifted from space 79 between spider 68 and bottom 24 into rotor 66 between upper and lower rotor spiders 67 and 68 and hence with the air drawn from tube 58, is discharged therefrom in a horizontal direction by centrifugal force into stator 61, as hereinafter described in detail, and thence into the main body of pulp within tank 21. Blades 78 cause continual circulation of pulp within the tank and consequently keep the sand from settling.

Figure 5:
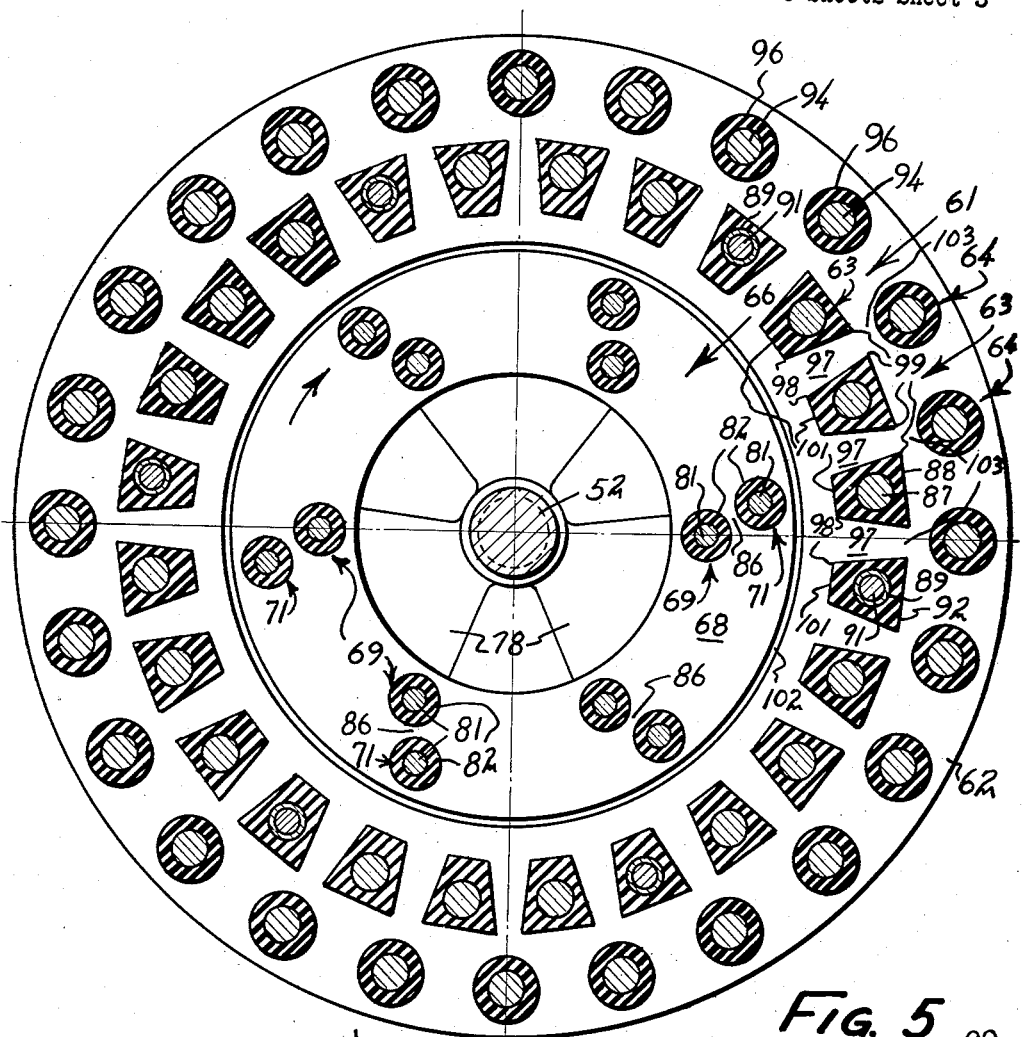
Fig. 5 is an enlarged horizontal sectional view taken substantially along line 5—5 of Fig. 2.

Rotor staves 69 and 71 are shown particularly in Fig. 5. As shown, there are two rows of vertical cylindrical members extending between upper and lower impeller spiders 67 and 68. Rotor staves 69 and 71 are subject to variation in form and arrangement. However, in the preferred embodiment illustrated herein, there are six inner staves 69 and six outer staves 71 employed in each row and arranged in pairs. Each stave comprises a steel rod 81 encased in a rubber sleeve 82, the ends of the staves being received in appropriate recesses in impeller spiders 67 and 68 and clamped in place by reason of spiders 67 and 68 being suitably mounted on the shaft 52 and drawn toward one another between the shoulder 83 and nuts 84 on shaft 52, the lower end of shaft 52 being suitably screw-threaded.

The centers of outer rotor staves 71 lie on a common circle and the centers of inner rotor staves 69 lie on another circle, both concentric with the vertical axis of shaft 52. Accordingly, the inner and outer staves move at different linear velocities when rotor 66 revolves. Each outer rotor stave 71 is offset rearwardly from its adjacent inner rotor stave 69 and so as the pulp is expelled centrifugally outwardly, it is contacted both by the inner staves and then a second time by the outer staves, due to the greater linear velocity of the outer staves. This effect augments the scrubbing action between the ore particles and rotor staves, and consequently causes a shearing action between the ore particles and adhering matter, such as slimes and other foreign substances, which results in a clean surface on the ore particles for better contact of the reagent and the froth. In addition, rotation of rotor 66 causes the pulp mass surrounding the rotor to move in a circular path but at slower velocity, with the result that a part of the combined pulp and air is forced to circulate through spaces 86 between the pairs of rotor staves 69 and 71, thereby providing convergence zones. As the pulp passes through convergence zones 86, there is a further division of the combined pulp and air into finely divided particles, as well as cleaning of the desired ore particles.

Stator 61 is best shown particularly in Fig. 5. As shown, there are two rows of vertical staves extending between upper and lower stator spiders or annular plate members 59 and 62. Stator staves 63 and 64 and their contour, together with their arrangement, are subject to variation. In the preferred embodiment illustrated herein, 24 inner and 24 outer staves are employed. Eighteen of the inner staves comprise a rod 87 encased in a rubber member 88. The remaining six inner staves comprise tubes 89, which are encased in rubber members 92 and their external configuration is similar to members 88.

The tubes 89 extend the axial length of these six stave members 63, best shown in Fig. 2, and they provide openings through which extend the bolt portions of rods 91, which in turn form a portion of the stator support means 90, hereinafter described in detail. Rods 91 are threaded at their upper end and are engaged by nuts 93 to clamp spiders 59 and 62 and staves 61 and 64 in position as a unit. The centers of the outer row of staves 64, which are illustrated in the preferred embodiment herein, are cylindrical and comprise steel rods 94 encased in rubber members 96, and all lie on a common circle concentric with shaft 52 and concentric with the common circle on which lie the centers of rods 91 and 87.

In a preferred embodiment of the invention, spider 59 is formed with a steel plate backing 60 covered with a resilient mat 60a which is cut out to form recesses to receive the ends of staves 59 and 62. Similarly, spider 62 comprises a backing 65 and resilient covering 65a cut away to receive the opposite ends of staves 59 and 62. At the same time, spiders 67 and 68 may be formed with backings 70 and 70a covered with resilient coverings 70b and 70c recessed to receive the ends of staves 69 and 71.

As illustrated particularly in Fig. 5, the edge of inner stator staves 63 lying nearest to rotor 66 is of lesser thickness than the opposite edge lying furthest from the rotor, so that a pair of adjacent sides of inner stator staves 66 form a space in the form of a nozzle throat 97. The distance between the inner corners 98 constitutes the nozzle throat opening, while the distance between outer corners 99 constitutes the narrowest part of the constriction of the nozzle throat, sometimes referred to as hydraulic opening or size.

Figure 6:
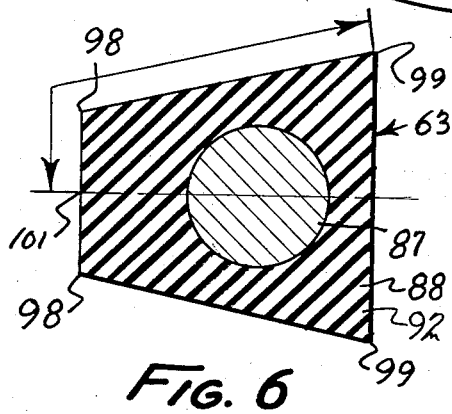
Fig. 6 is a schematic enlarged view of a stator stave.
Figure 6A:
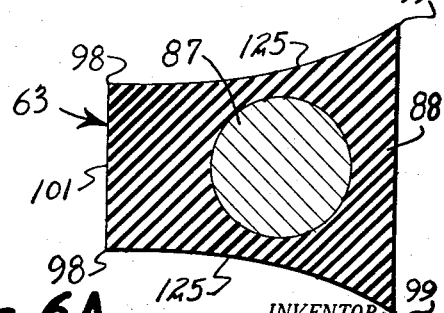
Fig. 6A is a view similar to Fig. 6 of a modified stave.

Referring to Fig. 6, the point marked 101 is the mid-distance of the edge of stave 63 lying nearest to rotor 66. One-half the length of scrubbing area is represented by the distance 101—98—99 and this length times the vertical height between upper and lower spiders 67—68 constitutes one-half the effective scrubbing surface area for each nozzle throat or pocket 97. Pockets 97 subject the pulp to nozzle action, whereas the combined pulp and air are expelled centrifugally continuously from rotor 66 at considerable velocity horizontally. The pulp readily traverses the thin pulp stream 102 between the external perimeter of rotor 66 and the edge of inner stator staves 63 and is forced through nozzle openings 98—98 into pockets 97, whence it is discharged through nozzle constriction 99—99 at sufficient pressure and velocity to traverse the thin pulp stream 103 that occurs between the outer edge of inner stator stave 63 and the inner face of outer stator stave 64 disposed externally around the inner row of staves 63. It will further be understood that the general rotative movement given to the body of pulp in tank 101 causes a circulation in the annular spaces 103 between staves 63 and 64.

One means of stator support is best shown in Fig. 2 comprising a rectangular plate 106 having a series of holes for rods 91, the lower ends of which extend through holes in plate 106 and are fastened thereto, as by welding. Above plate 106 the lower portion of rods 91 pass through tubes 89 that are encased within a rubber wear liner 107, while the other portions extend through tubes 92 in staves 63. Threaded top portions of rods 91 receive nuts 93. Plate 106 in turn is fastened to the upper face of bottom 24 of tank 21, as by welding. Accordingly, there results a rigid support for the stator and air tube 58.

In operation, as rotor 66 revolves, pulp is drawn up through space 79 into rotor 66 and simultaneously air is drawn down into the rotor from tube 58. Air and pulp are mixed by rotor 66 and forced outwardly by centrifugal force imparted by the revolving rotor. Staves 69 and 71 shear the slimes and adhering matter from the ore particles and further, as above explained, the novel arrangement of staves 69 and 71 results in better air dissemination and the pulp-air mixture is preconditioned before the mixture of pulp and air is subjected to further pressure and shearing action in stator 61. The pulp and air thus preconditioned are forcefully expelled centrifugally horizontally from rotor 66, and forced into nozzle throats or spaces 97 through throat openings 98—98 and then expelled forcefully through restricted nozzle openings 99—99 with sufficient velocity to cause forceful impingement on outer stator staves 64 which are radially offset with respect to staves 63 and disposed externally adjacent openings 99—99. Thereafter the pulp and air are discharged into the body of the pulp in tank 21 and the froth or bubbles formed by the intermingling of the finely divided ore particles and reagent rise to and above the pulp surface A, as is well understood in the flotation art.

While the pulp-air mixture is caused to traverse externally the surface 101—98—99 of the inner row of stator staves 63, the ore particles forcefully rub against the surface area A, as has been described, and by reason of convergence of throats 97, there is a further shearing of the slimes and other adhering matter from the ore particles. Upon emerging from nozzle openings 99—99 there is further air dissemination by forcefully contacting the surfaces of staves 64, causing further shearing action. The combined result of this action is that a greater amount of cleaned ore particles are produced and hence there is greater attraction to the finely divided air-reagent bubbles.

In practice it is well-known that in a single cell or tank, the recovery of desired ore particles is a fractional process and hence several cells in series are ordinarily employed, as indicated by Fig. 1. The original pulp feed flows first to an endmost cell, whence a portion of the desired ore particles is removed in the form of flotation concentrates or froth and thence the balance of the pulp that does not recirculate through the rotor and stator flows into the succeeding cell. There is a sufficient number of cells installed to effect the desired degree of recovery of ore particles in the pulp. Conversely, if a single cell is employed, the pulp that does not recirculate through the rotor and stator discharges through outlet aperture 34 and into outlet box 33.

The combined action of the rotor staves and the inner and outer staves or scrubbers scrub, scour and cleanse the ore particles and remove deleterious slimes or other matter more adequately than other flotation machines heretofore developed, due to the provision of and relative position of the greater surface area for a given size machine. Additionally, the action of the apparatus accomplishes greater dissemination of the air so as to produce a greater amount of fine bubbles or froth to attach themselves more effectively onto the ore particles, thereby increasing the grade of flotation concentrates, as well as materially increasing the capacity of the flotation machine.

Although the foregoing invention has been described in some detail by way of illustration and example for purposes of clarity of understanding, it is understood that certain changes and modifications may be practiced within the spirit of the invention and scope of the appended claims.

I claim:

1. A flotation machine comprising a tank; an annular stator in said tank having an upper and a lower stator spider, a plurality of scrubbers extending between said stator spiders, said scrubbers in cross section having sides diverging outwardly relative to the central axis of said spiders substantially continuously along the entire length of said sides, the distance between adjacent scrubbers being substantially greater at their inner ends than at their outer ends, said scrubbers in cross section having outer ends disposed substantially perpendicular to a radius from said central axis at the time of maximum divergence of said sides, the sides of said scrubbers defining pockets between adjacent scrubbers having outwardly converging walls terminating abruptly at the zone of maximum convergence of said pockets; an impeller within said stator having an upper and a lower impeller spider, a plurality of beaters extending between said impeller spiders, and means for rotating said impeller.

2. A flotation machine comprising a tank; an annular stator in said tank having an upper and a lower stator spider, a plurality of inner scrubbers extending between said stator spiders, said inner scrubbers in cross section having sides diverging outwardly relative to the central axis of said spider substantially continuously along the entire length of said sides, the distance between adjacent inner scrubbers being substantially greater at their inner ends than at their outer ends, said inner scrubbers in cross section having outer ends disposed substantially perpendicular to a radius from said central axis at the line of maximum divergence of said sides, the sides of said inner scrubbers defining pockets between adjacent inner scrubbers having outwardly converging walls terminating abruptly at the zone of maximum convergence of said pockets; a plurality of outer scrubbers, one said outer scrubber being positioned directly opposite the space between each pair of adjacent inner scrubbers, said outer scrubbers being positioned proximate the zone of the narrowest space between inner scrubbers; an impeller within said stator having an upper and a lower impeller spider; a plurality of beaters extending between said impeller spiders, and means for rotating said impeller.

3. A flotation machine according to claim 2 in which said lower impeller spider is formed with a plurality of openings associated with a plurality of pitched blades, said lower impeller spider being spaced above the bottom of said tank, whereby upon rotation of said impeller said blades draw liquid up from the bottom of said tank and into the space between said upper and lower impeller spiders inside said beaters.

4. A machine according to claim 2 in which said inner scrubbers are truncated triangles in cross section with the bases of said triangles outermost.

5. A flotation machine comprising a tank, a cagelike, annular stator in said tank having an upper and a lower stator spider, a plurality of vertical scrubbers extending between said stator spiders, adjacent scrubbers being farther apart at their inner ends than at their outer ends, said scrubbers having their outer ends disposed substantially perpendicular to a radial line from the axis of said stator, the sides of said scrubbers defining pockets between adjacent scrubbers, said pockets substantially continuously narrowing outwardly relative to said axis to increase the velocity of liquid flowing outwardly through said pockets and terminating at the zone of maximum convergence of said pockets, an impeller within said stator, and means for rotating said impeller.

6. A flotation machine comprising a tank, an impeller in said tank, means for rotating said impeller, and a cagelike, annular stator around said impeller having an upper and a lower stator spider, a plurality of inner scrubbers and a plurality of outer scrubbers extending between said stator spiders, said inner scrubbers being arranged substantially equidistant from the axis of said stator and having the inner ends of adjacent inner scrubbers farther apart than the outer ends of adjacent inner scrubbers and their outer ends disposed substantially perpendicular to a radial line from the axis of said stator at the line of maximum divergence of said sides, said outer scrubbers being arranged substantially equidistant from the axis of said stator immediately opposite the spaces between said inner scrubbers and in proximity to the zone of the narrowest space between inner scrubbers.

7. An aerating apparatus comprising a rotor and stator assembly, said stator assembly comprising upper and lower annular plate members interconnected by a plurality of stator staves, said stator staves being arranged in inner and outer concentric circular formations, the staves of said outer formation being radially offset with respect to the staves of said inner formation, the staves of said inner circular formation having sides which diverge in radially outward directions such that the sides of adjacent staves comprise nozzle structures, said rotor assembly comprising upper and lower spider members interconnected by a plurality of rotor staves and located within said inner circular formation, and means to rotate said rotor assembly.

8. The combination according to claim 7 wherein the stator staves of said outer circular formation are located in the paths defined by said nozzle structures.

9. The combination according to claim 8 wherein said rotor staves are arranged in closely spaced inner and outer concentric circular formations, the rotor staves of said outer circular formation being rearwardly offset in the direction of rotation with respect to the rotor staves of the inner circular formation.

10. The combination according to claim 9 wherein said lower spider member comprises a plurality of upwardly slanted blades and said upper spider member comprises a plurality of downwardly slanted openings.

11. In combination with an aerating apparatus, a stator assembly comprising upper and lower annular plate members, a first plurality of stator staves interconnecting said upper and lower plate members near the outer edges thereof, and a second plurality of stator staves interconnecting said upper and lower plate members near the inner edges thereof and radially offset with respect to the staves of said first plurality, said second plurality of staves having a cross-sectional shape generally similar to truncated triangles to form radially converging nozzle structures.

12. In combination with an aerating apparatus, a stator assembly comprising upper and lower annular plate members having resilient coverings on adjacent surfaces thereof, a first plurality of rod members interconnecting said upper and lower plate members near the outer edges thereof, a second plurality of rod members interconnecting said upper and lower plate members near the inner edges thereof and radially offset with respect to the rods of said first plurality, first resilient coverings mounted on said first plurality of rod members, and second resilient coverings mounted on said second plurality of rod members, said second resilient coverings having a cross-sectional shape generally similar to truncated triangles to form radially converging nozzle structures.

13. In combination with an aerating apparatus, a rotor assembly comprising upper and lower spider members, said upper spider member having a plurality of downwardly slanted openings and said lower spider member comprising a plurality of upwardly slanted blades, and a plurality of rod members interconnecting said spider members and disposed in closely spaced inner and outer concentric circular formations, the rod members of said outer circular formation being rearwardly offset in the direction of rotation with respect to the rod members of said inner circular formation.

14. The combination according to claim 13 wherein the adjacent surfaces of said spider members and said plurality of rod members are provided with resilient coverings.

References Cited in the file of this patent

UNITED STATES PATENTS

| 1,761,136 | Lord | June 3, 1930 |
| 1,963,122 | Fagergren | June 19, 1934 |
| 2,054,249 | Fagergren | Sept. 15, 1936 |
| 2,466,037 | McNeill | Apr. 5, 1949 |
| 2,609,097 | Dering | Sept. 2, 1952 |
| 2,713,477 | Daman | July 19, 1955 |

FOREIGN PATENTS

| 78,187 | Denmark | Mar. 5, 1951 |
| 108,227 | Australia | Aug. 8, 1939 |